Jan. 23, 1951   G. S. McCLOY   2,538,877
FOOD MIXER BEATER
Filed March 28, 1947   3 Sheets-Sheet 2
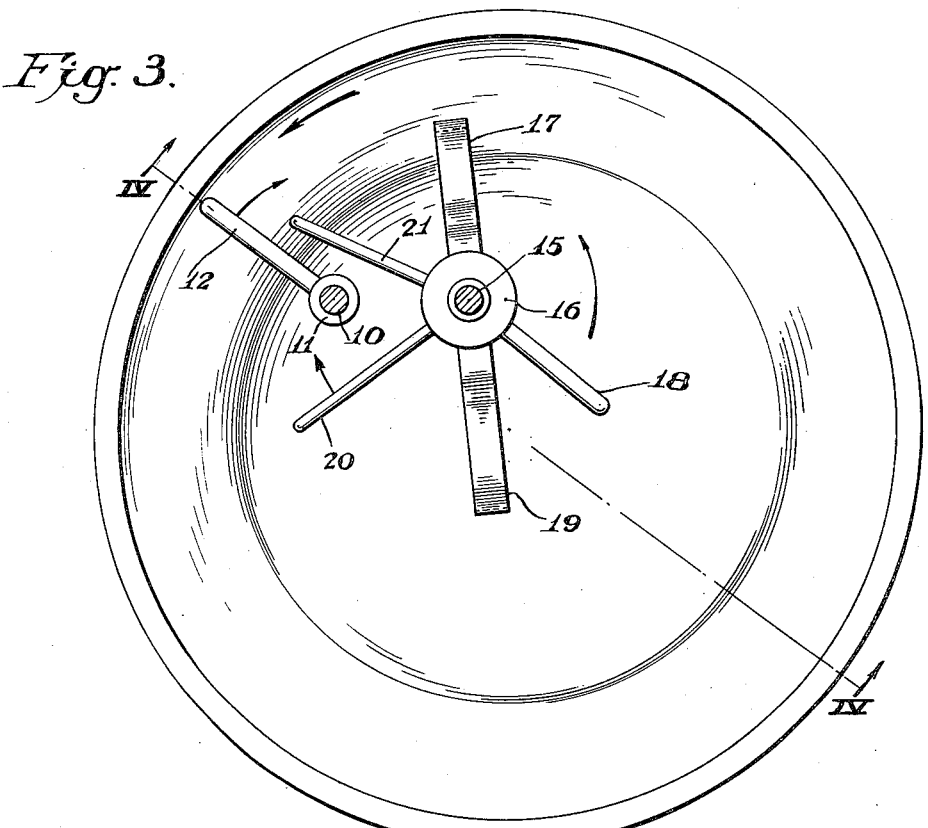
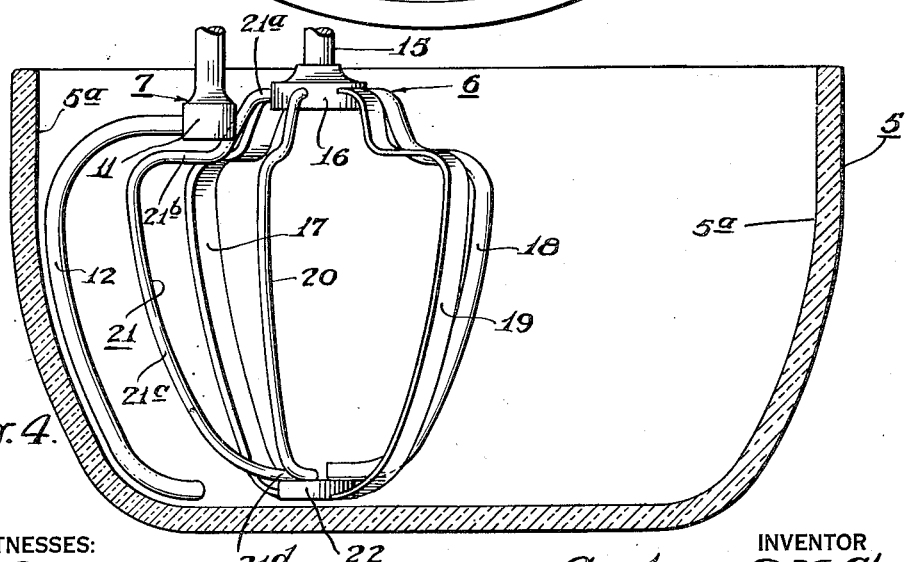
WITNESSES:
John M. Wright
E. H. Lutz
INVENTOR
Graham S. McCloy
BY R. J. Eisinger
ATTORNEY Jan. 23, 1951 G. S. McCLOY 2,538,877
FOOD MIXER BEATER
Filed March 28, 1947 3 Sheets-Sheet 3

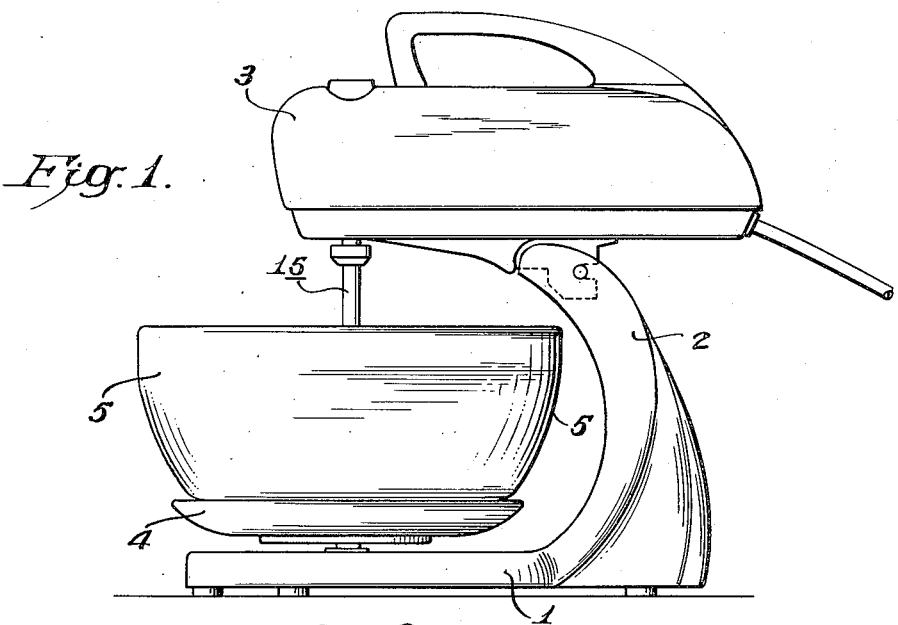
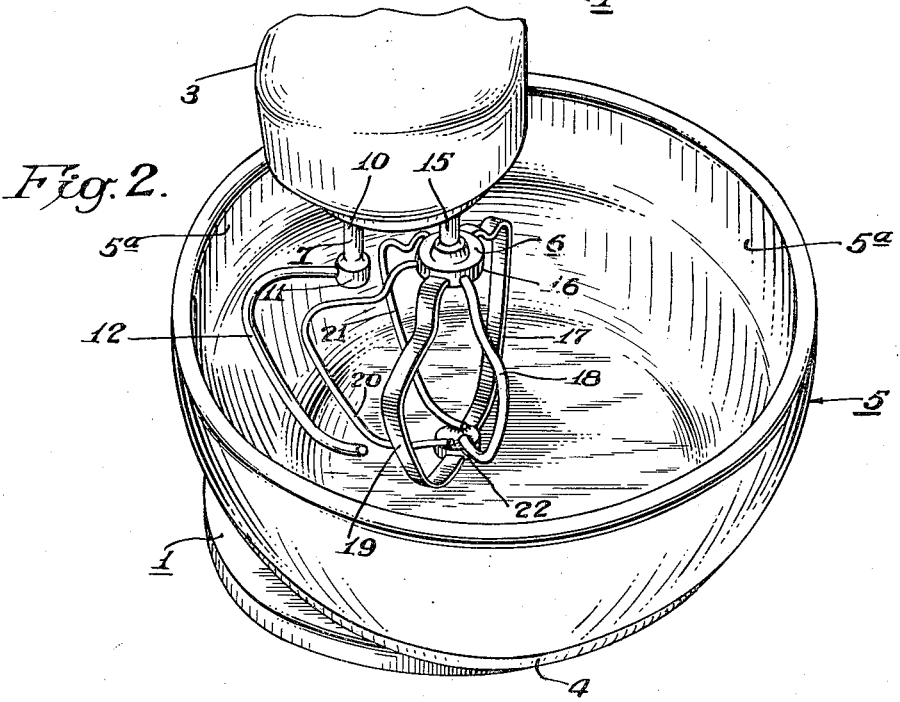

WITNESSES:
John M. Wright
E. H. Lutz

INVENTOR
Graham S. McCloy
BY R. J. Eisinger
ATTORNEY

Patented Jan. 23, 1951

2,538,877

UNITED STATES PATENT OFFICE 2,538,877

FOOD MIXER BEATER

Graham S. McCloy, Springfield, Mass., assignor to Westinghouse Electric Corporation, East Pittsburgh, Pa., a corporation of Pennsylvania Application March 28, 1947, Serial No. 737,756

4 Claims. (Cl. 259—84)

This invention relates to food mixers, and more particularly to a household food mixer having motor driven mixing elements or beaters.

Various types of food mixers have heretofore been developed, comprising a base for supporting a bowl, and a pair of motor driven beaters extending downwardly from an upper housing carried by the base. According to conventional design practices, the cooperating beaters are adapted to be rotated in opposite directions and may each comprise a number of matched relatively small blades or tines. Beaters of this type, known as dover type beaters, are operative to provide a characteristic chopping and mixing action.

It has been proposed to support the bowl on a rotary member of the food mixer so disposed with reference to the other elements that one of a pair of dover type beaters will be operated in close proximity to the side of the bowl while the other will rotate substantially in the center thereof. One purpose of such an arrangement has been to utilize the action of the outer beater for effecting rotation of the bowl through the medium of the batter contained in it, while the opposing action of the beater remote from the side of the bowl is expected to limit the rate at which the bowl is turned. Although this desired result can be achieved when ordinary beaters are operating in a bowl containing partly mixed or relatively fluid batter, the rapid spinning and chopping action of such beaters may at times promote undesirable high rotational speed of the bowl.

An obvious disadvantage inherent in one conventional type of beater assembly may be observed when creaming sugar and shortening. If, as is usually the case, the beaters do not conform to the interior surface of the bowl, and even though one beater may be located closely adjacent the side thereof, a considerable gap will exist between the beater elements and the bowl surface permitting quantities of the shortening and other ingredients to stick to the bowl beyond the reach of the beaters. To insure effective action by such beaters of conventional design, it is therefore necessary to employ a spatula or the like, for intermittently removing and redistributing the batter clinging to the inside of the bowl. The introduction of the spatula into the bowl while the beaters are rotating is undesirable, of course, since contact of the instrument with the operating elements may damage them.

Furthermore, in the operation of beaters of the conventional type in creaming sugar and shortening, relatively large unbroken lumps of the material tend to become deposited in the form of a ring around the inside of the bowl. Unless this deposit is consistently removed by a spatula the rotation of the outer beater in contact with the mass of ingredients accumulated on the wall of the bowl is then likely to effect rotation thereof at an undesirably rapid rate, since little or no material can be carried to the center to receive the retarding effect of the inner beater.

It has been proposed to provide special mixing apparatus to effect folding and stirring of ingredients, by means of a single large cage-like beater element rotatable through a circular path within the bowl, but such devices, although efficient, have heretofore involved complex and expensive auxiliary operating gears and also fastening the bowl to the base.

An object of my invention is the provision of simply constructed and inexpensive beater elements operable in a mixer device of the usual construction, to effect a folding and stirring action such as that heretofore attainable only with the aforesaid special mixing apparatus.

Another disadvantage inherent in some conventional beaters employed in food mixers of the household type is a tendency to pick up quantities of batter or dough after a certain viscosity has been developed in the course of the mixing operation, causing the material to climb the beaters toward the motor housing unless the mixing operation is closely supervised by the operator. Beaters of the conventional type having this unfavorable characteristic are also apt to be difficult to clean.

I have found that superior results may be insured with a household mixer assembly of simple and economical design by providing new and improved beaters which will be cooperative to provide a mixing action of a folding and stirring nature, rather than the chopping action associated with conventional or dover type beaters. It has been demonstrated that when an ordinary household food mixer is equipped with these improved beaters, the desired folding and stirring action is attained without requirement of a spatula, while the rotational speed of the bowl can be controlled automatically. A further notable characteristic of the improved beaters is their utility and marked efficiency in mixing a wide variety of food ingredients. It is thus possible to use the mixer device, so equipped, throughout a mixing operation even when the ingredients to be mixed are heavy or tacky, such as mixtures ordinarily requiring initial hand folding. An example of such an operation, wherein dover type beaters have been found relatively inefficient, may be observed in the final operation of adding flour and sugar to beaten egg whites in the preparation of angel food cake. It is obviously desirable that this food mixing operation, and others such as creaming of sugar and shortening, be brought within the range of utility of a household mixer.

It is accordingly a principal object of the present invention to provide electrically driven food mixer means having all of the desirable features of conventional devices and exhibiting, in addition, the improved operating characteristics and wider range of utility just mentioned.

Another object is to render possible the operation of a household mixer to effect folding and stirring of ingredients by provision of novel and improved beater elements cooperative to achieve this result without necessitating use of any auxiliary planetary gears or the like.

The present invention provides an improved food mixer and bowl assembly including a first beater having a single tine conformed to the interior surface of the bowl and rotatable in close proximity thereto, and a second beater having a plurality of similarly formed tines adapted to cooperate with the single tine of the first beater to effect folding and stirring of ingredients contained in the bowl.

Another feature of the invention is the provision of improved beaters for a household food mixer and bowl comprising one beater having a plurality of tines operative to impart a major rotating force to the bowl through the medium of the batter therein, and another cooperating beater having a tine conformed to the shape of the bowl and operative in sufficiently close proximity to the side of the bowl to wipe away and redistribute the batter, while controlling the speed at which the bowl rotates.

Still another object of the invention is to provide a pair of improved beaters having the characteristics already pointed out, and constructed and arranged to minimize any tendency to cause batter, such as dough, to climb the beater shafts. As a corollary to this object, it is proposed to design and adapt these beaters for easy cleaning.

Another object of the invention is to provide improved beaters for a food mixer which are cooperative with the batter contained in the associated bowl to effect rotation thereof at a constant velocity, substantially without regard to the viscosity of the mixture in the bowl.

A more specific feature of the invention is the provision of a mixer device comprising motor means, a pair of separable beater members jointly operative thereby, one of the beater members having a single curved tine generally conformed to the shape of the bowl, and the other beater member having a plurality of curved tines, the tines of each beater being dimensioned and arranged for rotation through the axis of the associated beater member.

These and other objects are effected by my invention as will be apparent from the following description and claims taken in connection with the accompanying drawings, forming a part of this application, in which:

Fig. 1 is an elevational view of a food mixer of the type in which the invention may be employed;

Fig. 2 is an isometric or perspective view of the improved beater members constructed in accordance with the invention;

Fig. 3 is a plan view illustrating the relative positions of a mixer bowl and a pair of beaters embodying the invention;

Fig. 4 is a sectional view taken substantially along the line of 4—4 of Fig. 3;

Figure 5:
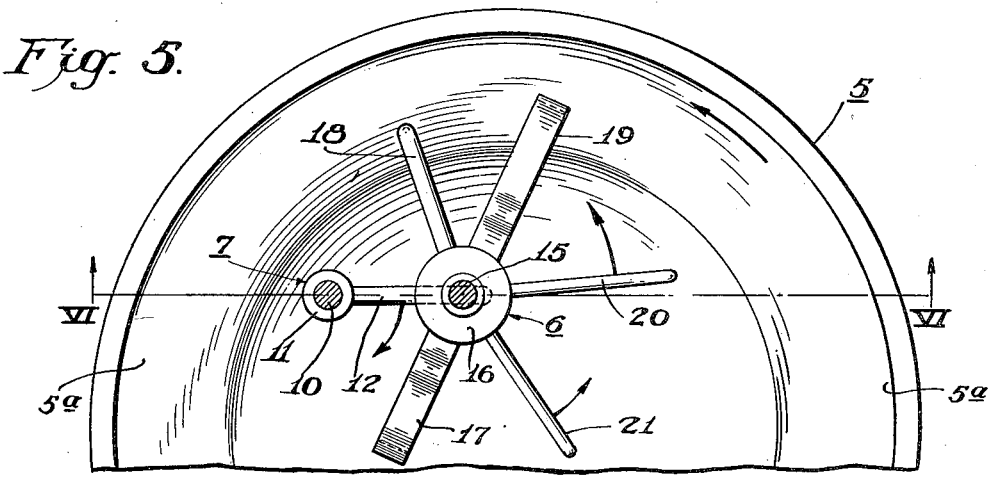
Figure 6:
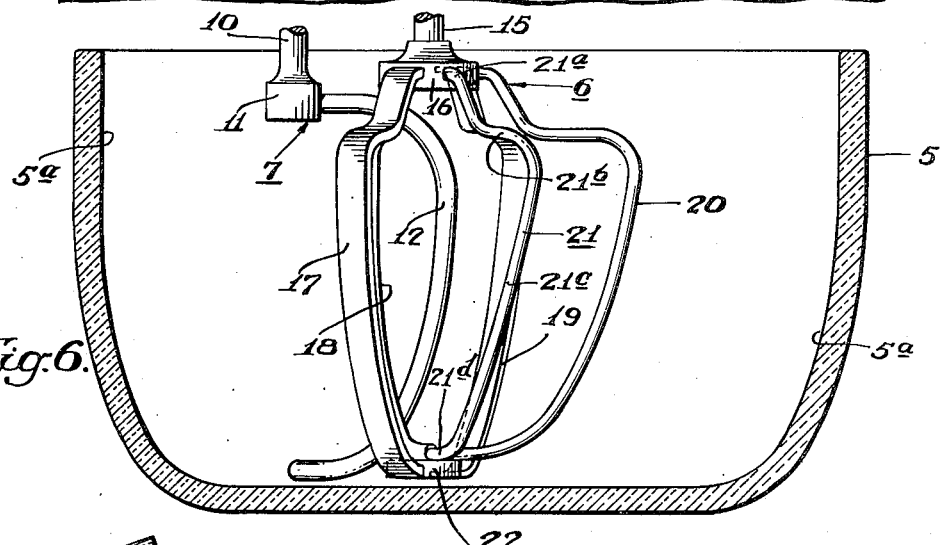
Figure 7:
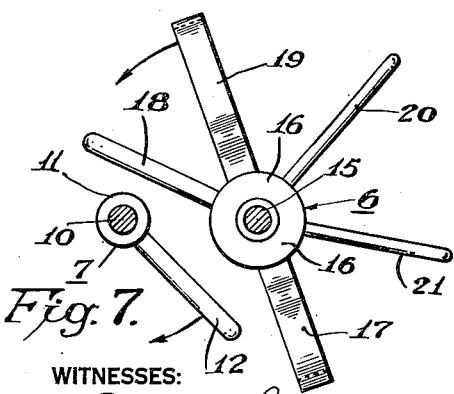
Figure 8:
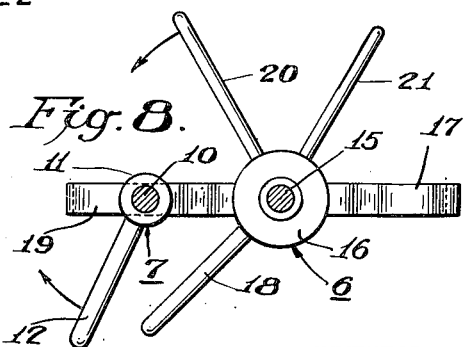

Figs. 5 and 6 are views similar to Figs. 3 and 4, respectively, but showing the beaters in different positions; and Figs. 7 and 8 are plan views illustrating other positions of the beaters.

Referring to Fig. 1 of the drawings, the invention may be utilized in connection with a household food mixer comprising a base 1 having a pedestal or upright portion 2 supporting a housing 3, in which a driving motor (not shown) may be mounted.

The housing 3 is adapted to overhang a portion of the base on which is journaled a turntable 4 adapted for supporting a removable bowl 5, into which a pair of metal beater members 6 and 7 are adapted to extend. The housing 3 is pivotally mounted on the pedestal 2 so that the forward end carrying the beater members 6 and 7 may be swung upwardly out of the bowl 5. The upper ends of the beater members are detachably secured in suitable rotatable socket members (not shown) that are jointly operative by means of the motor in the housing 3. It will be understood that the mixer device shown in Fig. 1 may be of any desired construction, the present form of mixer having been chosen for illustrative purposes only. Inasmuch as the construction of the upper ends of the beaters 6 and 7 does not constitute a part of the present invention, it is deemed unnecessary to disclose these portions in detail. If desired, of course, each beater may readily be provided with an individual form of tip adapted to fit only the rotatable socket member in motor housing 3 for which it is intended, and in proper angular position.

As shown in Figs. 3 and 4, the beaters 6 and 7 are preferably arranged within the bowl 5 in off-center relation, in order to promote superior mixing operation as well as to maintain favorable outside clearance dimensions of the beaters with respect to the bowl, and of the bowl with respect to the pedestal or body portion of the mixer device. The beater 7 is smaller than the beater 6 and comprises a normally vertical spindle or shaft 10 having an enlarged portion 11 from which projects a single radially disposed arcuate tine or blade 12. In the present embodiment of the invention, the tine 12 is preferably formed of bar stock or heavy wire, although, if desired, this tine may be made of material in another form, such as strap-like metal. As shown in Fig. 4, the upper portion of the tine 12 projects outwardly from shaft 11 a greater distance than does the lower portion, which slants inwardly, closely conforming to the interior surface 5a of bowl 5 and substantially in alignment with axis of the shaft. It will be noted that tine 12, when passing through the position illustrated in Figs. 3 and 4 is adapted to move in close proximity to the side 5a of the bowl, so that any batter clinging to the side of the bowl at that point will be wiped away, as hereinafter explained.

The large beater 6 comprises a spindle or shaft 15 disposed parallel to and spaced from the shaft 10. The shaft 15 is somewhat shorter than shaft 10, and has an enlarged portion 16, the bottom surface of which is disposed above the path through which the single tine 12 of beater 7 revolves. Secured to the enlarged portion 16 of beater 6 are a plurality of radially disposed arcuate blades or tines which are so proportioned and spaced as to cooperate in interleaving relation with tine 12. In the present form of the invention, I have provided the beater 6 with five non-uniform tines 17, 18, 19, 20 and 21, which are constructed and arranged to insure efficient operation in mixing ingredients of different consistencies.

In the present form of the invention, as shown in Fig. 3, the tines 17 and 19 are disposed substantially 180 degrees apart, and are preferably formed of strap-like metal of different thicknesses. Tines 20 and 21 are preferably made of wire or light bar stock and are arranged at one side of tines 17 and 19, as viewed in Fig. 3. The remaining tine 18 may be made of somewhat heavier bar stock and is disposed at the other side of tines 17 and 19 in the neighborhood of 45 degrees from tine 19. It will thus be seen that tines 17 and 18 are angularly spaced apart sufficiently to provide adequate clearance to receive the tine 12 of beater 7 therebetween when the beaters are rotated through the position illustrated in Fig. 5 of the drawings. It will be understood that by making tines 17 and 18 somewhat heavier than tines 19, 20 and 21, proper dynamic balance of beater 6 is maintained despite the large gap between tines 17 and 18.

Referring again to Fig. 4, each of the tines forming part of beater 6 is provided with an off-set bent portion adjacent the upper end which is secured to the enlarged portion of shaft 15, and a lower arcuate portion conforming substantially to the inner surface 5a of the bowl, somewhat along the lines of the lower portion of tine 12 already described. Referring to tine 21 by way of example, the upper end 21a thereof projects from the enlarged portion 16 of shaft 15, and is bent downwardly and outwardly to provide the off-set portion 21b, below which is disposed the arcuate portion 21c terminating in the lower end 21d. The off-set bent portion of each of the tines 17 to 21 is provided for enabling each tine to clear the enlarged portion 11 of shaft 10, during operation as hereinafter explained.

As shown in Fig. 4, each tine of the beater 6, as represented by tine 21, is adapted to pass beneath the shaft 10 and through the axis of beater 7. The single tine 12 of the latter is likewise adapted to pass through the axis of beater 6. The lower ends of each of tines 17 to 21 may be welded or otherwise suitably secured together to form a strong structural unit. In the present form in which the invention is illustrated, the lower ends of the respective tines are secured to disc member 22.

In operation, the motor contained in housing 3, shown in Fig. 1, is operative to drive the two beaters 6 and 7 in opposite directions, in a well known manner. Assuming that beater 6 is rotated in counterclockwise direction, while beater 7 is turned in clockwise direction, as viewed in Fig. 3, it will be apparent that the larger beater 6 in revolving close to the center of the bowl will impart a major torque to the bowl through the medium of the batter contained therein, and that the opposing action of beater 7 will tend to counteract this major torque, at least during movement of tine 12 in close proximity to the side of bowl 5. The beater 7 thus prevents rotation of the bowl at excessive speed in addition to serving as a means for effecting periodic wiping away and redistribution of the batter, which would otherwise cling to the surface of the bowl. As the beaters 6 and 7 rotate beyond the position illustrated in Fig. 3 and into the position in which they are shown in Fig. 5, the single tine 12 of beater 7 is carried beneath the shaft 15 of the large beater 6, thereby cleaning away any batter or dough tending to climb to the shaft of beater 6 from the several tines thereof. Continued rotation of beaters 6 and 7 will then carry the respective tines successively through the positions indicated in Figs. 7 and 8, in the latter of which tine 19 of beater 6 is shown passing beneath the shaft 10 of beater 7. It will thus be seen that the beaters 6 and 7 are constructed and arranged to cooperate in a self-cleaning manner. The cooperative relationship between the beaters will be further apparent upon examination of Fig. 2 of the drawings.

It has been demonstrated that, with the large beater 6 operating to provide the major rotating force for bowl 5 and the single tine of beater 7 operating to supply a retarding or controlling force, the pair of beaters serves to maintain the rotation of the bowl at a fairly uniform rate, regardless of the viscosity of the material undergoing the mixing operation. Although the single tine 12 of beater 7 is carried close to the inside surface 5a of bowl 5 only once in each revolution, the wiping or spatula action of this tine ultimately becomes effective over substantially the entire inside surface of the bowl due to the fact that the bowl speed and the beater speed are not synchronized. In other words, the tine 12 is brought in close proximity with the inside surface 5a at a different point during each successive cycle. It will be apparent that, since the single tine 12 thus constantly removes batter from the side of the bowl and deposits it within the path of the tines of beater 6, both beaters will constantly be effective to stir, fold and mix the entire quantity of ingredients contained in the bowl, even when this quantity is small.

The mixer may also be used with a rotatable bowl smaller than the bowl 5. Such a smaller bowl is disposed so that the tine 12 is in the same relation to the side of the bowl as shown in Figures 3 and 4. Since the use of bowls of different diameter is well known, and since the operation of the invention is the same, further discussion is not deemed necessary.

From the foregoing it will be seen that a household mixing device equipped with improved beaters constructed in accordance with my invention will be operative to effect more rapid and thorough mixing of all ingredients than heretofore practicable. Inasmuch as the improved beaters are operative to subject the batter to a stirring and folding action, the initial hand folding ordinarily required is rendered unnecessary. By reason of the novel construction of the tines of each of the beaters, and particularly of the single tine 12 of beater 7 which moves in close proximity of the inner surface of the bowl, any tendency of the batter to accumulate on the side of the bowl is eliminated, without use of a spatula. While uniform rotation of the bowl at a desired speed is insured, it will further be apparent that with the pair of improved beaters disposed in off-center relation with respect to the bowl, it will at all times be possible to add ingredients while the mixing device is in operation.

While I have shown my invention in but one form, it will be obvious to those skilled in the art that it is not so limited, but is susceptible of various changes and modifications without departing from the spirit thereof.

What I claim is:

1. A pair of cooperating beaters for a food mixer of the class embodying a drive shaft and transmission means operative by said drive shaft, including jointly rotative elements to which said beaters are detachably secured in a substantially vertical position for rotation in opposite directions, one of said beaters having a single arcuate tine projecting radially of the axis thereof, and the other beater having a plurality of radially disposed arcuate tines, some formed of flat strip material and some of round bar material, and so grouped as to provide interleaving therewith of said single tine once during each revolution thereof to facilitate folding and stirring action during the operation of said food mixer, the number of tines of said other beater being sufficient to cause the bowl to rotate in the same direction as said other beater.

2. In a food mixer comprising a base carrying a motor and having a freely rotatable turntable adapted to support a bowl containing batter or the like, a pair of non-uniform rotary beaters operative in said bowl by said motor, the larger of said beaters having a plurality of radially projecting tine members rotatable to turn said bowl in the same direction when mixing batter therein, and the smaller of said beaters having a tine member rotatable in the opposite direction in interleaving relation with the tine members of said larger beater, said smaller beater being operative in closer proximity to the side of said bowl than said larger beater.

3. A food mixer comprising a base, a turntable mounted upon said base and freely rotatable thereon, a bowl supported on said turntable and adapted to contain batter or the like, first and second beaters mounted on said base to extend in vertical parallel relation into said bowl, and driving mechanism for effecting rotation of said beaters in opposite directions, the first beater having a relatively small number of tines, at least one of which conforms substantially to the inner surface of the side wall of the bowl and passes in close proximity thereto during its rotation, the other beater being disposed closer to the center of the bowl and having a larger number of tines for effecting rotation of the bowl in the same direction as the second beater, the tines of the second beater passing through the axis of rotation of the first beater, the latter being clear of obstruction at the axis to permit the tines of the second beater to pass through said axis.

4. A food mixer comprising a base, a turntable mounted upon said base and freely rotatable thereon, a bowl supported on said turntable and adapted to contain batter or the like, first and second beaters mounted on said base and extending in vertical parallel relation into said bowl, and driving mechanism for effecting rotation of said beaters in opposite directions, the first beater having a relatively small number of tines, at least one of which conforms substantially to the inner surface of the side wall of the bowl and passes in close proximity thereto during its rotation, and the second beater being disposed closer to the center of the bowl and having a larger number of tines for effecting rotation of the bowl in the same direction as the second beater.

GRAHAM S. McCLOY.

REFERENCES CITED

The following references are of record in the file of this patent:

UNITED STATES PATENTS

| Number | Name | Date |
|---|---|---|
| 849,273 | Schurmann et al. | Apr. 2, 1907 |
| 1,433,710 | Flink et al. | Oct. 31, 1922 |
| 1,867,243 | Aastrup | July 12, 1932 |
| 2,063,692 | Martinet | Dec. 8, 1936 |
| 2,357,160 | Behar | Aug. 29, 1944 |